(12) United States Patent
Renard et al.

(10) Patent No.: US 8,532,572 B2
(45) Date of Patent: Sep. 10, 2013

(54) MOBILE INTEGRATED DISTRIBUTION AND TRANSACTION SYSTEM AND METHOD FOR NFC SERVICES, AND A MOBILE ELECTRONIC DEVICE THEREOF

(75) Inventors: Laurent Renard, Hong Kong (HK); Gregory Puente-Castan, Hong Kong (HK)

(73) Assignee: Toro Development Limited, Taipei (TW)

( * ) Notice: Subject to any disclaimer, the term of this patent is extended or adjusted under 35 U.S.C. 154(b) by 257 days.

(21) Appl. No.: 12/965,597

(22) Filed: Dec. 10, 2010

(65) Prior Publication Data
US 2011/0143663 A1    Jun. 16, 2011

(30) Foreign Application Priority Data
Dec. 11, 2009   (TW) .............................. 98142439 A (51) Int. Cl.
*H04B 5/00*    (2006.01)

(52) U.S. Cl.
USPC ......................................... 455/41.1; 455/41.2

(58) Field of Classification Search
USPC ................................................ 455/41.1, 41.2
See application file for complete search history.

(56) References Cited

U.S. PATENT DOCUMENTS

| 8,108,318 | B2* | 1/2012 | Mardikar ........................ 705/65 |
| 2007/0083378 | A1* | 4/2007 | Guarraci et al. ................. 705/1 |
| 2009/0248883 | A1* | 10/2009 | Suryanarayana et al. .... 709/229 |

* cited by examiner

*Primary Examiner* — Tuan H Nguyen
(74) *Attorney, Agent, or Firm* — Leason Ellis LLP (57) ABSTRACT

A mobile distribution system includes a widget generator for creating a widget having a certificate and a communication interface for distributing the widget to a mobile electronic device with a transaction terminal having at least one secure element for storing a plurality of secure applications; and retrieving the widget information from the mobile electronic device on NFC transactions in use of the transaction terminal.

21 Claims, 5 Drawing Sheets

MOBILE INTEGRATED DISTRIBUTION AND TRANSACTION SYSTEM AND METHOD FOR NFC SERVICES, AND A MOBILE ELECTRONIC DEVICE THEREOF

CROSS-REFERENCE TO RELATED APPLICATIONS

This non-provisional application claims priority under 35 U.S.C. §119(a) on Patent Application No(s). 098142439 filed in Taiwan, R.O.C. on Dec. 11, 2009 the entire contents of which are hereby incorporated by reference.

BACKGROUND OF THE INVENTION

1. Field of the Invention

The present invention relates to an integrated distribution and transaction system and method, and more particularly, to a mobile integrated distribution and transaction system and method for NFC (Near-Field Communication) services, and a mobile electronic device thereof.

2. Description of the Prior Art

Near Field Communication (NFC) is a new, short-range wireless connectivity technology that evolved from a combination of existing contactless identification and interconnection technologies. Products with built-in NFC will dramatically simplify the way consumer devices interact with one another, helping people speed connections, receive and share information and even make fast and secure payments.

Operating at 13.56 MHz and transferring data at up to 424 Kbits/second, NFC provides intuitive, simple, and safe communication between electronic devices. NFC is both a "read" and "write" technology. Communication between two NFC-compatible devices occurs when they are brought within four centimeters of one another: a simple wave or touch can establish an NFC connection, which is then compatible with other known wireless technologies such as Bluetooth or Wi-Fi. The underlying layers of NFC technology follow universally implemented ISO, ECMA, and ETSI standards. Because the transmission range is so short, NFC-enabled transactions are inherently secure. Also, physical proximity of the device to the reader gives users the reassurance of being in control of the process.

NFC can be used with a variety of devices, from mobile phones that enable payment or transfer information to digital cameras that send their photos to a TV set with just a touch. The possibilities are endless, and NFC is sure to take the complexities out of today's increasingly sophisticated consumer devices and make them simpler to use.

SUMMARY OF THE INVENTION

One object of the present invention is to provide a mobile integrated distribution and transaction system and method particularly for use on information processing of NFC services.

Another object of the present invention is to provide a mobile distribution system and method to distribute the widgets used for NFC transactions.

Yet another object of the present invention is to provide a mobile transaction system and method to use the widgets in NFC transactions.

Still another object of the present invention is to provide a mobile electronic device to use the widgets in NFC transactions.

In order to achieve the aforementioned objects, the present invention provides a mobile integrated distribution and transaction system comprising: a server having a widget generator for creating a widget having a certificate; a communication interface for distributing the widget and retrieving the widget information associated with NFC transactions; and at least one mobile electronic device having a transaction terminal comprising an NFC modem and at least one secure element divided into a plurality of secure domains, and a virtual machine for managing the widget and changing the widget information while the NFC modem is enabling the NFC transactions with the secure element.

In order to achieve the aforementioned objects, the present invention provides a mobile distribution system comprising: a widget generator for creating a widget having a certificate; and a communication interface for distributing the widget to a mobile electronic device with a transaction terminal having at least one secure element for storing a plurality of secure applications, and retrieving the widget information from the mobile electronic device using the transaction terminal for NFC transactions.

In order to achieve the aforementioned objects, the present invention provides a mobile distribution method, comprising the following steps: generating a widget having a certificate; distributing the widget to a mobile electronic device with a transaction terminal having at least one secure element for storing at least one secure application; and retrieving the widget information from the mobile electronic device on NFC transactions enabled by one of the secure element in use of the transaction terminal.

In order to achieve the aforementioned objects, the present invention provides a mobile transaction system to use a widget on wireless transactions, comprising: means for receiving widgets, each widget having a certificate displays multimedia content associated with a secure application; a graphical user interface for displaying the widgets; means for selecting one of the widgets on the graphical user interface; and means for transmitting the widget information while enabling the wireless transactions with a secure element.

In order to achieve the aforementioned objects, the present invention provides a mobile transaction method to use a widget on NFC transactions, comprising: receiving widgets, where each widget has a certificate; displaying the widgets on a graphical user interface; selecting one of the widgets on the graphical user interface; and changing the widget information while an NFC modem is enabling the NFC transactions with a secure element.

The aforementioned method is implemented by a software installed on a mobile electronic device comprising the NFC modem and the graphical user interface.

The aforementioned method is executed by computer-executable instructions stored in a computer-readable media.

In order to achieve the aforementioned objects, the present invention provides a mobile electronic device for NFC services, comprising: a transaction terminal having an NFC modem for transmitting radio frequency (RF) signals associated with a contactless data of NFC transactions, and at least one secure element for storing at least one secure application; and a virtual machine for authenticating and managing a plurality of widgets, each widget having a certificate, and changing the widget information while the NFC modem is enabling the NFC transactions with the secure element.

The aforementioned mobile electronic device is a PDA or an iPod or a cell phone or a hand-held device or a multimedia player.

In order to achieve the aforementioned objects, the present invention provides a mobile electronic device for NFC services, composed of: a wireless modem for receiving a widget with a certificate from a wireless network; at least one secure element for storing at least one secure application; an NFC modem for transmitting radio frequency (RF) signals associated with a contactless data of NFC transactions; a graphical user interface for displaying the widget; a memory for storing the widget; and a processor performing a virtual machine for managing the widget(s) and changing the widget(s') information while the NFC modem is enabling the NFC transactions with the secure element.

In the mobile integrated distribution and transaction system and method, the mobile distribution system and method, the mobile transaction system and method, and the mobile electronic device thereof according to the present invention, associated information of various transaction applications can be displayed on a mobile electronic device through widgets having a certificate, NFC transactions can be enabled by a secure element for storing a secure application, and information associated with a secure application can be received or processed by the widgets.

DETAILED DESCRIPTION OF THE PREFERRED EMBODIMENTS

Figure 1:
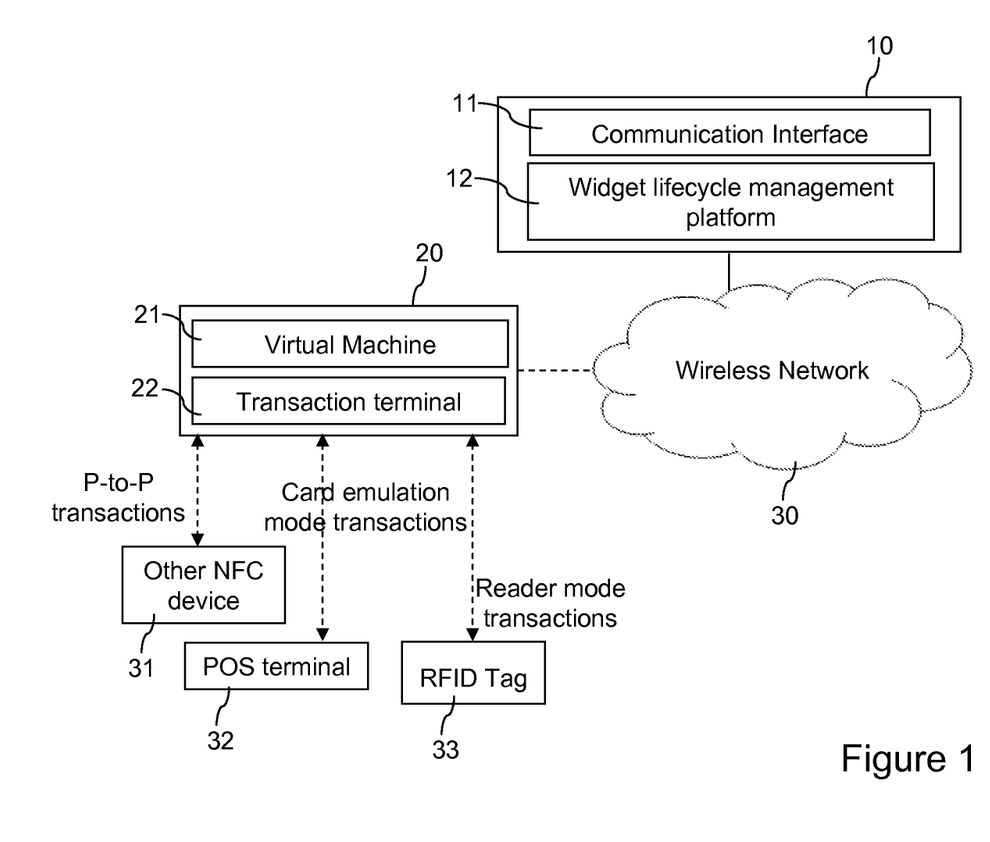
FIG. 1 shows a system architecture diagram of a mobile integrated distribution and transaction system for NFC service in accordance with the present invention.

FIG. 1 shows a system architecture diagram of a mobile integrated distribution and transaction system for NFC service in accordance with the present invention. The mobile integrated distribution and transaction system for NFC service of the present invention comprises a server 10 comprising a communication interface 11 communicated with a wireless network 30 and executes a widget lifecycle management platform 12. The widget lifecycle management platform 12 comprises a widget generator for creating a widget. The widget may display multimedia content associated with a secure application. In an embodiment of the present invention, the widget generator is a software development kit (SDK) of the widget lifecycle management platform 12, and the widget is an independent application that is developed using SDK and that can only be run on a virtual machine 21 of a mobile electronic device 20.

In an embodiment of the present invention, the widget is assigned a certificate which allows the widget to enable a NFC transaction with a secure element for storing a plurality of secure applications. In an embodiment, the widget is assigned a lifecycle, and the widget lifecycle management platform 12 retrieves the widget information used on the NFC transaction through the communication interface 11 during the valid lifecycle. In an embodiment of the present invention, the widget is assigned an identification number representing an account for conducting the NFC transactions under a secure application. In each embodiment of the present invention, the secure application is, but not limited to, a transport application or a credit/debit application or a coupon application or a secure access application or a loyalty card application or an electronic purse application or a ticketing application.

The widget lifecycle management platform 12 of the mobile integrated and transaction system of the present invention uses the communication interface 11 to distribute a plurality of widgets to at least one mobile electronic device 20 through the wireless network 30. In an embodiment of the present invention, the widget lifecycle management platform 12 also uses the communication interface 11 to retrieve the widget information used on the NFC transaction from the mobile electronic device 20 so as to analyze the information associated with NFC transactions received by the widget.

Still referring to FIG. 1, the mobile integrated distribution and transaction system of the present invention comprises at least one mobile electronic device 20 comprising a virtual machine 21 and a transaction terminal 22. The virtual machine 21 is an implementation of software and provides a widget management platform for managing the widget received by the mobile electronic device 20 from the server 10. In an embodiment of the present invention, the transaction terminal 22 allows the mobile electronic device 20 to enable a peer-to-peer transaction with other NFC devices 31, so that the mobile electronic device 20 changes the widget information or that the widget receives the information associated with transactions. In another embodiment of the present invention, the transaction terminal 22 allows the mobile electronic device 20 to enable a card emulation mode transaction with a point-of-sales (POS) terminal 32, so that the mobile electronic device 20 changes the widget information or that the widget receives the information associated with transactions. In yet another embodiment of the present invention, the transaction terminal 22 allows the mobile electronic device 20 to enable a reader mode transaction with a radio-frequency identification (RFID) tag 33, so that the mobile electronic device 20 changes the widget information or that the widget receives the information associated with transactions. In other words, an NFC transaction enabled by the mobile electronic device 20 includes, but is not limited to, a peer-to-peer transaction, a card emulation mode transaction, and a reader mode transaction.

Figure 2:
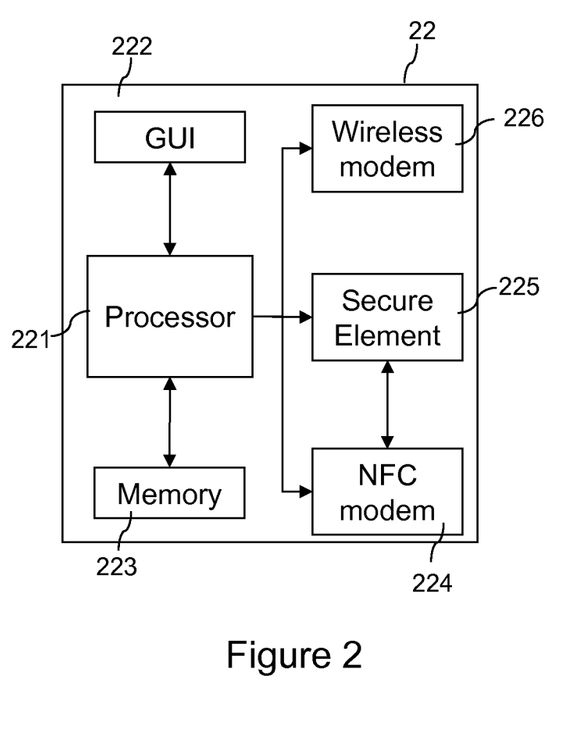
FIG. 2 shows a block diagram of a transaction terminal in accordance with the present invention.

In an embodiment of the present invention, a mobile electronic device 20 for NFC services comprises a transaction terminal 22 as shown in FIG. 2 and a virtual machine 21. The transaction terminal 22 comprises: an NFC modem for transmitting radio frequency (RF) signals associated with contactless data of NFC transactions or for transmitting data associated with NFC transactions; and at least one secure element divided into at least one secure domain where a specific secure application is located or stored. In an embodiment of the present invention, the secure element is implemented by a SIM card for a cell phone or a secure memory card, such as a micro-SD card. The virtual machine 21 is installed on the mobile electronic device 20 for authenticating and managing a plurality of widgets, and each widget has a certificate. After the certificate is authenticated by the virtual machine 21, the virtual machine 21 allows the widget to access the secure element 225. The widget changes the widget information or retrieves information under a corresponding secure application stored in one of secure domains while the NFC modem is enabling the NFC transactions with the secure element 225.

FIG. 2 shows a block diagram of a transaction terminal in accordance with the present invention. The transaction terminal 22 is implemented on a mobile electronic device 20. In an embodiment of the present invention, the mobile electronic device 20 is a PDA or an iPod or a cell phone or a hand-held device or a multimedia player. In another embodiment of the present invention, the mobile electronic device 20 comprises the transaction terminal 22 only, exclusively used for conducting NFC transactions under the control of a secure application located or stored in a secure domain.

In an embodiment of the present invention, a mobile electronic device 20 comprises a transaction terminal 22. The transaction terminal 22 is used for NFC transactions, composed of a wireless modem 226, at least one secure element 225, an NFC modem 224, a memory 223, a graphical user interface 222, and a processor 221. The wireless modem 226 uses a wireless protocol which is 3G, GPRS, Bluetooth, or WiFi or any other wireless communication protocol such that the mobile electronic device 20 communicated with a wireless network 30, and the widget is distributed to the mobile electronic device 20 through the wireless modem 226 of the transaction terminal 22. The secure element 225 is a hardware embedded into the mobile electronic device 20 and is divided in a plurality of secure domains where secure applications are located or stored. In an embodiment of the present invention, the mobile electronic device 20 is a cell phone, and the secure element 225 is the SIM card for a cell phone or a secure memory card which can be plugged into the memory card slot of the mobile electronic device 20. For example, such secure memory card is a micro-SD card. In another embodiment of the present invention, the mobile electronic device 20 may comprises a plurality of secure elements 225. For example, both a SIM card and a memory card are embedded into a NFC mobile phone. The SIM card and the memory card are divided into a plurality of secure domains for storing a plurality of secure applications, respectively.

The NFC modem 224 comprises a built-in NFC antenna (not shown) for NFC transactions and is electronically connected to the secure element 225. The processor 221 of the transaction terminal 22 executes software program instructions of a widget management platform, and is electrically connected to the wireless modem 226 to receive the widgets distributed by the server 10 or to transmit information associated with NFC transactions received by the widget back to the server 10. The widget is assigned an identification number representing an account for conducting NFC transactions under the control of a secure application stored in the secure element, and the information transmitted back to the server 10 from the widget includes the identification number.

In addition, the processor 221 electronically connects to the secure element 225 and the NFC modem 224 to access the secure element 225 for enabling the NFC transactions. The processor 221 also electronically connects to the memory 223 for storing the received widget and connects to the graphical user interface 222 for displaying multimedia content associated with a secure application represented by the widget.

In an embodiment of the present invention, the widget assigned a certificate is corresponding to a specific secure application stored in a secure domain. The certificate will be authenticated by the widget management platform provided by the virtual machine 21. If the certificate passes the authentication, the virtual machine 21 will allow the widget to access the secure element 225 to enable the NFC modem 224 to conduct the NFC transactions under a secure application, so that the widget information is changed or that the transaction information associated with a secure application is received by the widget. A secure application is located or stored in a secure domain. For example, a loyalty card application is located in a secure domain which enables a loyalty card transactions with the secure element 225. For another example, an electronic purse application is located in a secure domain which enables an electronic purse transaction with the secure element 225. For another example, a coupon application is located in a secure domain which enables a coupon transaction with the secure element 225.

In an embodiment of the present invention, the widget is assigned a certificate and a lifecycle. During the valid lifecycle, if the certificate passes the authentication of the virtual machine 21, it will allow the widget to access the secure element 225 to enable the NFC modem 224 to conduct the NFC transactions. The widget also transmits information associated with the NFC transaction back to the server 10 through the wireless modem 226 during the valid lifecycle. In an exemplary embodiment, the widget displays multimedia content associated with a coupon application and is assigned a lifecycle associated with the coupon. The widget is distributed to the mobile electronic device 20, which uses the coupon information of the widget through NFC transactions under the coupon application during the valid lifecycle of the coupon.

Figure 3A:
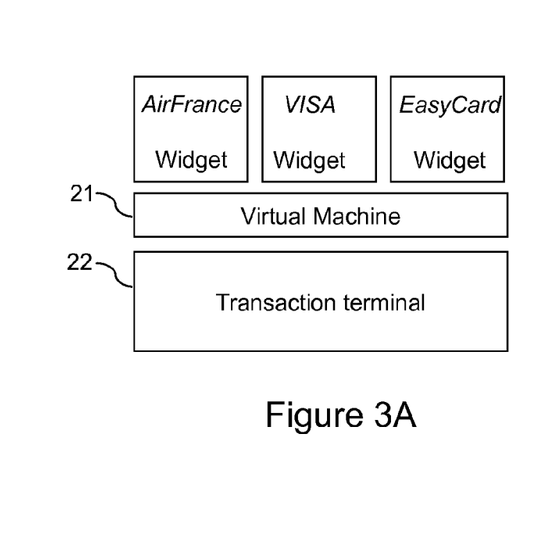
FIG. 3A shows a schematic block diagram illustrating the software and the hardware of the mobile electronic device.

FIG. 3A shows a schematic block diagram illustrating the software and the hardware of the mobile electronic device. In the mobile electronic device of the present invention, the virtual machine 21 manages the widget received by the mobile electronic device 20 from the server 10, and authenticates the certificate of the widget to allow the widget to communicate with the transaction terminal 22. Each widget displays multimedia content associated with a secure application; for example, it may be a widget associated with AirFrance, VISA, or EasyCard applications. In the embodiments of the present invention, the virtual machine 21 may be installed on various mobile electronic devices 20 (such as a PDA, an iPod, a mobile phone, a handheld device, or a multimedia player) and provides a widget management platform such that the authenticated widget accesses the secure element 225 of the transaction terminal 22 to enable NFC transactions.

Figure 4:
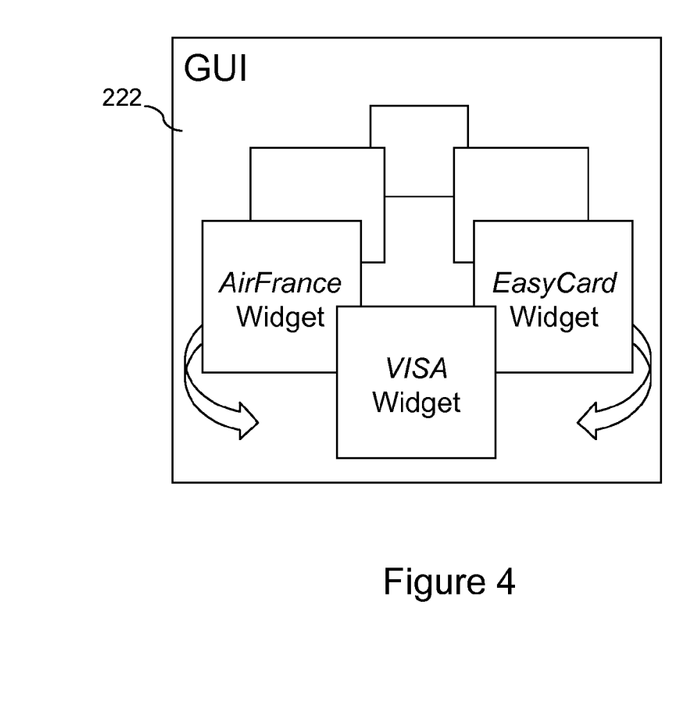
FIG. 4 shows a schematic diagram illustrating a plurality of applied widgets displayed on the graphical user interface of the mobile electronic device in accordance with the present invention.

FIG. 4 shows a schematic diagram illustrating a plurality of applied widgets displayed on the graphical user interface of the mobile electronic device in accordance with the present invention. In an embodiment of the present invention, the widgets managed by the virtual machine 21 may be displayed by the graphical user interface 222 of the transaction terminal 22, and it is preferable that the graphical user interface 222 is implemented by a touch panel. The user may move the finger on the touch panel in the arrow direction shown in FIG. 4 to select one of the widgets, such as the widget associated with a VISA application stored in a secure element, and then move the selected widget to the up front position. When the user uses the finger to click on the up front widget on the touch panel, it means that the user decides to use that selected widget to enable NFC transactions.

Once the user selects a widget, the virtual machine 21 will allow the widget to access the secure element 225 of the transaction terminal 22 to activate the NFC modem 224. The selected widget then waits for an event triggered by the NFC modem 224 so that the widget information changes or that the widget receives transaction information associated with the VISA secure application, wherein the event is an interaction associated with the NFC transaction, as shown in FIG. 4.

Figure 3B:
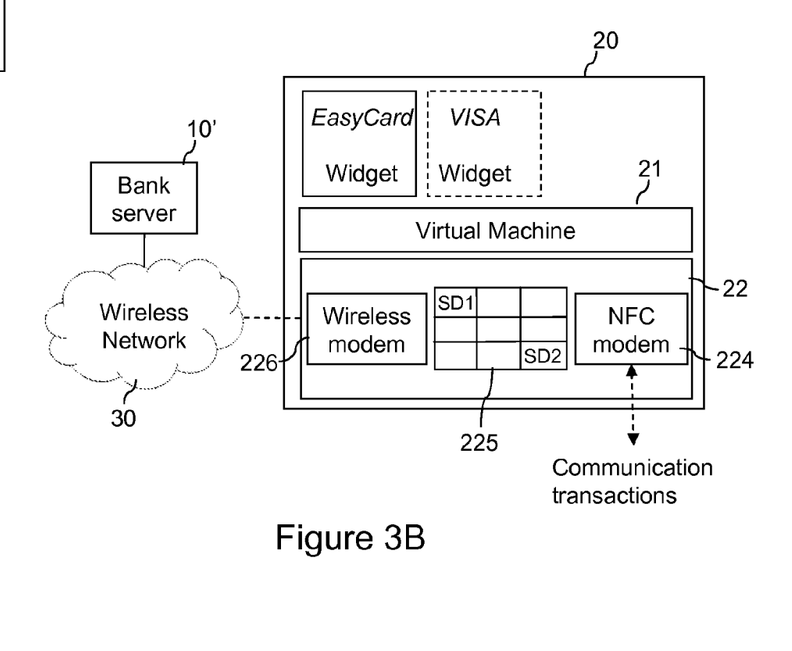
FIG. 3B shows a schematic block diagram illustrating the mobile electronic device of the FIG. 3A communicating with the bank server for receiving widgets and enabling a transaction communication.

FIG. 3B shows a schematic block diagram illustrating the mobile electronic device of the FIG. 3A communicating with the bank server for receiving widgets and enabling a transaction communication. In an embodiment of the present invention, a secure element 225 of the mobile electronic device 20 is provided by a bank, such as a secure micro-SD card which can be plugged into the micro-SD card slot of the mobile electronic device 20. The memory space of micro-SD card may be divided in a plurality of secure domains such as SD1, SD2 as shown in FIG. 3B. One secure application is located or stored in one secure domain; for example, a VISA secure application is located in a secure domain which enables VISA secure transactions using the secure element 225. The secure application is, but not limited to, a transport application or a credit/debit application or a coupon application or a secure access application or a loyalty card application or an electronic purse application or a ticketing application.

A bank server 10' issues a secure application downloaded and stored into one secure domain of the secure element 225, and issues widgets promoted by the bank. Each widget is assigned a certificate and the certificate allows the widget to be authenticated by the virtual machine 21 to access the secure element 225 such that the widget received by the mobile electronic device 20 from the bank server 10' can enable NFC transactions under a corresponding secure application located in the secure domain of the secure element 225.

Figure 5:
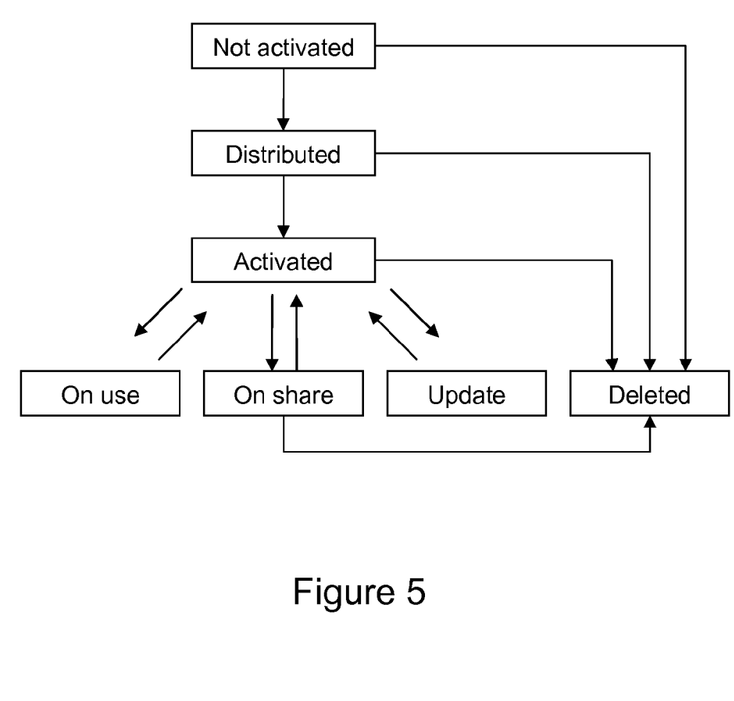
FIG. 5 shows a schematic block diagram illustrating the various states of a widget in accordance with the present invention.

FIG. 5 shows a schematic block diagram illustrating the various states of a widget in accordance with the present invention. The widget used in the mobile integrated distribution and transaction system of the present invention has a plurality of states. The initial state of the widget is "not activated" when the widget is created on the server. The state of the widget will change to "deleted" if the widget is assigned a lifecycle but the state of the widget remains as "not activated" after the valid lifecycle is past. The mobile electronic device 20 requests the server 10 for downloading a widget. The state of the widget is "distributed" when the widget is being distributed to the virtual machine 21 of the mobile electronic device 20 before the widget is activated successfully. The state of the widget will change from "distributed" to "activated" when the widget is authenticated by the virtual machine 21 and then successfully accesses the corresponding secure application stored in the secure elements 225.

The virtual machine 21 allows the widget to access the secure element 225 of the transaction terminal 22 to activate the NFC modem 224 when the user selects a widget on the graphical user interface 222. The widget then reacts to an event triggered by the NFC modem 224 such that the state of the widget changes from "activated" to "in use" under a specific secure application corresponding to the widget, and the event is an interaction associated with NFC transactions. The state of the widget will return from "in use" to "activated" after the widget completes processing the information on NFC transactions.

In an embodiment of the present invention, the widget, such as a widget associated with a coupon application, will change its state from "in use" to "deleted" after the widget completes processing the information on NFC transactions. In another embodiment of the present invention, when an error occurs while the widget is processing the information on NFC transactions, such as a date conflict error or a secure application conflict error on NFC transactions, then the state of the widget will change from "in use" to "error" and the graphical user interface 222 will display the error information. The state of the widget will return from "error" to "activated" after the error is resolved.

In an embodiment of the present invention, the widget can transfer messages between two virtual machines of separate mobile electronic devices. The virtual machine 21 will allow the widget to access the secure element 225 of the transaction terminal 22 to activate the NFC modem 224 when the user chooses to share a widget on the graphical user interface 222. The widget then reacts to an event triggered by the NFC modem 224 such that the state of the widget changes from "activated" to "on share" under a specific secure application corresponding to the widget, and the event is an interaction associated with NFC transactions. The state of the widget will return from "on share" to "activated" after the widget completes processing the information on NFC transactions.

In an embodiment of the present invention, the virtual machine 21 will allow the widget to access the secure element 225 of the transaction terminal 22 to activate the NFC modem 224 when the user chooses to update a widget on the graphical user interface 222. The widget then reacts to an event triggered by the NFC modem 224 such that the state of the widget changes from "activated" to "updated" under a specific secure application corresponding to the widget, and the event is an interaction associated with NFC transactions. The state of the widget will return from "on share" to "updated" after the widget updates the information on NFC transactions.

Figure 6:
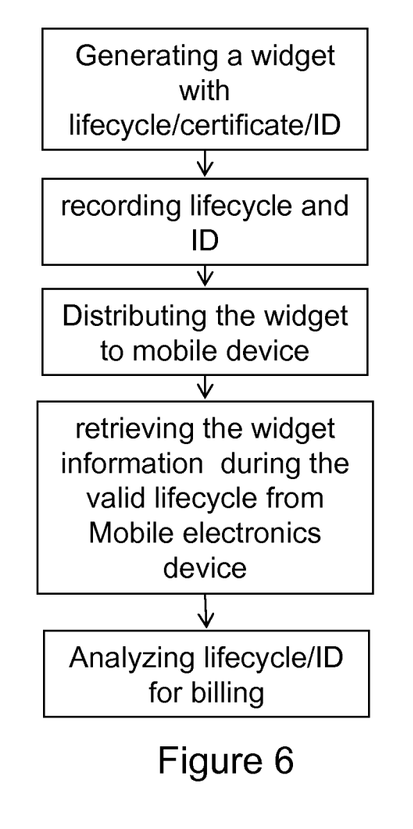
FIG. 6 is a flow chart showing a mobile distribution method in accordance with the present invention.

FIG. 6 is a flow chart showing a mobile distribution method in accordance with the present invention. In an embodiment of the invention, the mobile distribution system implements a mobile distribution method, the method comprising the following steps: creating a widget displaying multimedia content associated with a secure application such as a transport application or a credit/debit application or a coupon application or a secure access application or a loyalty card application or an electronic purse application or a ticketing application. The widget only executes on a virtual machine 20 of the mobile electronic device 20 or installed on the mobile electronic device 20.

In the mobile distribution method, the step of creating a widget further comprises: initializing a state of the widget as "not activated" when the widget is created; assigning a certificate to the widget, wherein the widget is associated with a specific secure application such as a transport application or a credit/debit application, and the certificate allows the widget authenticated by the virtual machine 21 to access the secure element 225 embedded or plugged into the transaction terminal 22 to enable NFC transactions to retrieve information under a specific secure application; assigning a lifecycle to the widget, wherein the widget downloaded to the mobile electronic device 20 may process or retrieve information on NFC transactions during the valid lifecycle and transmit information back to the server 10; and assigning an identification number representing an account for conducting NFC transactions under the control of a secure application corresponding to the widget. In addition, the method comprises the following step: recording the certificate, lifecycle and the identification number assigned to the widget to gather statistics for the mobile distribution system or to analyze the widget.

In an embodiment of the present invention, the mobile distribution system further comprises the following steps: distributing the widget to the mobile electronic device 20 and changing the state of the widget from "not activated" to "distributed", wherein the mobile electronic device 20 has a transaction terminal 22 comprising at least one secure element 225 for storing a secure application and a virtual machine 21; and retrieving the widget information from the mobile electronic device 20 while the state of the widget is "activated", wherein the widget information is gathered or updated by the widget while the mobile electronic device 20 enables NFC transactions. In another embodiment of the present invention, the mobile distribution method further comprises the following step: analyzing the information gathered or updated by the widget for transaction accounting according to the recorded lifecycle and identification number.

Figure 7:
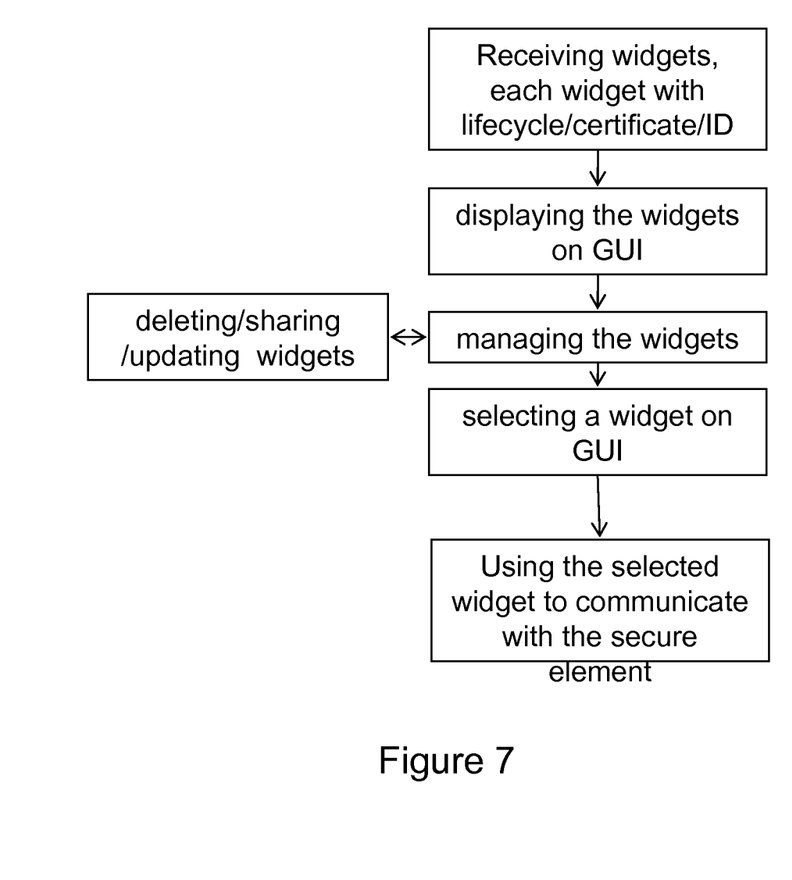
FIG. 7 is a flow chart showing a mobile transaction method in accordance with the present invention.

FIG. 7 is a flow chart showing a mobile transaction method in accordance with the present invention. In an embodiment of the present invention, the mobile transaction method is implemented by the mobile transaction system of the present invention or by the mobile electronic device 20 as shown in FIG. 1, wherein the mobile electronic device comprises the transaction terminal 22 as shown in FIG. 2. The mobile transaction method is implemented by a software installed on the mobile electronic device 20 comprising the NFC modem and the graphical user interface 222. The mobile transaction method comprises the following steps: receiving the widgets distributed by the server 10, each widget having a certificate, and/or a lifecycle and a identification number, wherein the certificate allows the widget authenticated by the virtual machine 21 to access the secure element 225 embedded or plugged into the transaction terminal 22 to enable NFC transactions, wherein the identification number represents an account for conducting NFC transactions under a secure application, and wherein the widget information is changed while the NFC modem is enabling the NFC transactions during the valid life cycle; and authenticating the certificate of the widget to determine whether the widget can access the secure element 225 of the transaction terminal 22, wherein the widget is activated if the widget successfully accesses the secure element 225 to retrieve information from a specific secure application stored in the secure element, and the state of the widget changes from "distributed" to "activated".

The mobile transaction method further comprises: displaying the widgets on the graphical user interface 222, wherein the widgets displays multimedia content associated with a secure application; managing the widgets; selecting one of the widgets on the graphical user interface 222 to use, share or update such that the selected widget reacts to an event, which is an interaction associated with NFC transactions, triggered by the NFC modem 224 and changing the state of the widget to "in used", "on share" or "updated"; Using the selected widget to communicate with the secure element; changing or transmitting the widget information while the NFC modem 224 is enabling NFC transactions with the secure element 225; and changing the state of the widget back to "activated" after the widget is used, shared or updates the received information on NFC transactions.

In an embodiment of the present invention, the method further comprises: the widget retrieving information associated with the NFC transaction from the NFC modem, or a secure application corresponding to the widget; and transferring the widget or widget information on to the mobile electronic device 20 having an NFC modem through the NFC transaction, or through a combination of the NFC transaction and a communication means.

What is claimed is:

1. A mobile distribution system, comprising:
a widget generator for creating a widget having a certificate and a plurality of states; and
a communication interface for distributing the widget to a mobile electronic device with a transaction terminal having at least one secure element for storing a plurality of secure applications;
wherein the widget is configured for authentication by a virtual machine installed on the mobile electronic device;
wherein an initial state of the widget distributed to the mobile electronic device changes, based on the authentication, in order to activate the widget during NFC transactions, and
wherein the widget is configured to access, based on the authentication, a corresponding one of the secure applications stored in the secure element to enable the mobile electronic device to perform at least one NFC transaction using the corresponding one of the secure applications.

2. The mobile distribution system of claim 1, wherein the widget displays multimedia content associated with the corresponding one of the secure applications.

3. The mobile distribution system of claim 1, wherein the widget is assigned a lifecycle, and the communication interface is configured to retrieve from the widget information associated with NFC transactions during the lifecycle.

4. The mobile distribution system of claim 1, wherein the widget is assigned an identification number representing an account for conducting NFC transactions under a secure application.

5. The mobile distribution system of claim 1, wherein the widget is configured to respond to the at least one NFC transaction occurring by either changing the widget information or retrieving information on the at least one NFC transaction associated with the secure application.

6. The mobile distribution system of claim 1, wherein the corresponding one of the secure applications comprises at least one of a transport application, a credit/debit application, a coupon application, a secure access application, a loyalty card application, an electronic purse application, and a ticketing application.

7. The mobile distribution system of claim 1, wherein the at least one secure element comprises at least one of a secure SIM card, a secure memory card, and secure internal memory.

8. A mobile distribution system, comprising:
a widget generator for creating a widget having a certificate; and
a communication interface for distributing the widget to a mobile electronic device with a transaction terminal having at least one secure element for storing a plurality of secure applications, wherein the secure element is divided into a plurality of secure domains, and each of the secure applications is stored in a respective secure domain;
wherein the widget is configured for authentication by a virtual machine installed on the mobile electronic device; and
wherein the widget is configured to access, based on the authentication, a corresponding one of the secure applications stored in the secure element to enable the mobile electronic device to perform at least one NFC transaction using the corresponding one of the secure applications.

9. A mobile distribution method, comprising the following steps:
generating a widget having a certificate and a plurality of states;
distributing the widget to a mobile electronic device with a transaction terminal having a secure element for storing at least one secure application;
wherein the widget is configured for authentication through verification of the certificate,
wherein an initial state of the widget distributed to the mobile electronic device changes, based on the authentication, in order to activate the widget during an NFC transaction, and wherein the widget is configured to access, based on the authentication, the at least one secure application to enable the at least one secure application to perform at least one NFC transaction; and retrieving widget information from the mobile electronic device on NFC transactions enabled by the secure element in use of the transaction terminal.

10. The mobile distribution method of claim 9, comprising the following steps: assigning a lifecycle to the widget; and retrieving from the widget information en-associated with NFC transactions during the lifecycle.

11. The mobile distribution method of claim 9, comprising the following step: assigning an identification number to the widget, the identification number representing an account for conducting NFC transactions under a secure application.

12. A mobile transaction method to use a widget on NFC transactions, comprising:

receiving widgets, each widget having a certificate and a lifecycle;

displaying the widgets on a graphical user interface;

receiving a selection of one of the widgets on the graphical user interface, wherein the selected widget is configured to access, based on authentication of the certificate, at least one secure application residing in a secure element to enable the at least one secure application to perform at least one NFC transaction using an NFC modem; and changing widget information during the lifecycle while the NFC modem is enabling the NFC transaction with the secure element.

13. The mobile transaction method of claim 12, wherein the widget displays multimedia content associated with the secure application.

14. The mobile transaction method of claim 12, wherein the widget receives the data from the NFC modem or a secure domain associated with NFC transactions under the secure application corresponding to the widget.

15. The mobile transaction method of claim 12, wherein the certificate allows the widget to access the secure element to enable the NFC transactions responsive to the authentication.

16. The mobile transaction method of claim 12, wherein the widget is assigned an identification number representing an account for conducting NFC transactions under the secure application.

17. A mobile transaction system to use a widget on wireless transactions, comprising:

means for receiving widgets, each widget having a certificate and being configured to display multimedia content associated with a secure application;

a virtual machine configured to authenticate and manage the received widgets;

a graphical user interface for displaying the widgets;

means for receiving a selection of one of the widgets on the graphical user interface;

means for transmitting widget information while enabling the wireless transactions with a secure element; and means for changing the widget information while the NFC transactions are enabled with the secure element, wherein the certificate allows the widget to access the secure element to enable the wireless transactions under the control of the secure application.

18. The mobile transaction system of claim 17, wherein the means for transmitting the widget information is an NFC modem, and wherein the wireless transactions are NFC transactions.

19. The mobile transaction system of claim 17, wherein the secure application is stored in the secure element.

20. The mobile transaction system of claim 17, wherein the widget is assigned a lifecycle, and the means for transmitting widget information transmits the widget information during the lifecycle while an NFC modem is enabling the wireless transactions.

21. The mobile transaction system of claim 17, wherein the widget is assigned an identification number representing an account for conducting wireless transactions under the secure application.

* * * * *